US012379757B2

(12) United States Patent
Tsuno et al.

(10) Patent No.: US 12,379,757 B2
(45) Date of Patent: Aug. 5, 2025

(54) INFORMATION PROCESSING APPARATUS, METHOD FOR CONTROLLING INFORMATION PROCESSING APPARATUS, AND STORAGE MEDIUM

(71) Applicant: HONDA MOTOR CO., LTD., Tokyo (JP)

(72) Inventors: Koichi Tsuno, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 18/210,376

(22) Filed: Jun. 15, 2023

(65) Prior Publication Data
US 2023/0324969 A1   Oct. 12, 2023

Related U.S. Application Data

(63) Continuation of application No. PCT/JP2021/003519, filed on Feb. 1, 2021.

(51) Int. Cl.
*G06F 1/32*  (2019.01)
*G06F 1/26*  (2006.01)
*H01M 10/48* (2006.01)

(52) U.S. Cl.
CPC .............. *G06F 1/26* (2013.01); *H01M 10/48* (2013.01); *H01M 2220/20* (2013.01)

(58) Field of Classification Search
None
See application file for complete search history.

(56) References Cited

U.S. PATENT DOCUMENTS

| 5,664,635 | A  |   | 9/1997  | Koga et al.    |           |
|-----------|----|---|---------|----------------|-----------|
| 8,536,826 | B2 |   | 9/2013  | Matsuoka et al.|           |
| 2011/0066309 | A1 |   | 3/2011  | Matsuoka et al.|        |
| 2012/0187899 | A1 |   | 7/2012  | Ozaki          |           |
| 2016/0308259 | A1 | * | 10/2016 | Eifert         | H01M 10/486 |

(Continued)

FOREIGN PATENT DOCUMENTS

| JP | 2011-65752  | A | 3/2011 |
|----|-------------|---|--------|
| JP | H08-037703  | A | 7/2012 |

(Continued)

OTHER PUBLICATIONS

International Search Report for PCT/JP2021/003519 mailed Mar. 30, 2021 with partial English Translation.
IPRP for PCT/JP2021/003519 mailed Oct. 7, 2021.

*Primary Examiner* — Fahmida Rahman
(74) *Attorney, Agent, or Firm* — Thomas Horstemeyer, LLP

(57) ABSTRACT

An information processing apparatus with a DC-DC converter, comprising: a calculation unit configured to calculate an impedance of a mobile battery attached to the information processing apparatus; and a control unit configured to control continuation or stop of a boost operation of the DC-DC converter on a basis of the impedance, wherein the control unit performs control to continue the boost operation of the DC-DC converter when the impedance is less than a threshold, and performs control to continue the boost operation by limiting some of functions of the information processing apparatus when the impedance is equal to or more than the threshold and less than a second threshold.

5 Claims, 4 Drawing Sheets

(56) References Cited

U.S. PATENT DOCUMENTS

| | | | |
|---|---|---|---|
| 2017/0070085 A1* | 3/2017 | Cher | H02J 7/34 |
| 2017/0179737 A1 | 6/2017 | Emi et al. | |
| 2017/0269162 A1* | 9/2017 | Thiel | G01R 31/3835 |
| 2020/0067335 A1* | 2/2020 | Lim | H02J 7/0068 |
| 2022/0085634 A1* | 3/2022 | Shirakami | H02J 7/00712 |

FOREIGN PATENT DOCUMENTS

| | | |
|---|---|---|
| JP | 2012-157123 A | 8/2012 |
| JP | 2014-235782 A | 12/2014 |
| JP | 2017-118642 A | 6/2017 |
| WO | 2022/162938 A1 | 8/2022 |

* cited by examiner

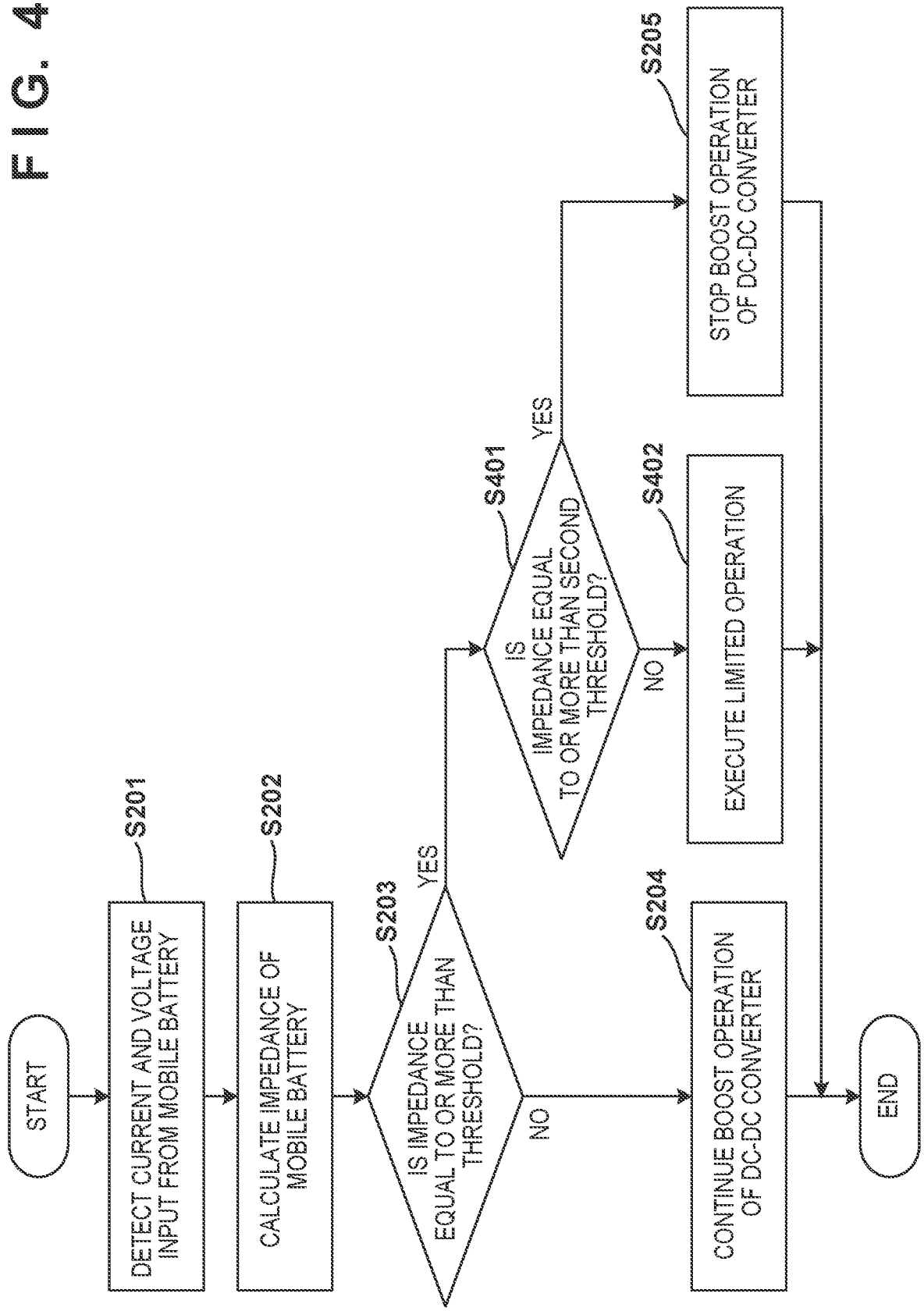

INFORMATION PROCESSING APPARATUS, METHOD FOR CONTROLLING INFORMATION PROCESSING APPARATUS, AND STORAGE MEDIUM

CROSS-REFERENCE TO RELATED APPLICATION(S)

This application is a continuation of International Patent Application No. PCT/JP2021/003519 filed on Feb. 1, 2021, the entire disclosures of which is incorporated herein by reference.

BACKGROUND OF THE INVENTION

Field of the Invention

The present invention relates to an information processing apparatus, a method for controlling an information processing apparatus, and a storage medium.

Description of the Related Art

In a case of an apparatus that is used with a detachable mobile battery attached thereto, a mobile battery (copied product) of a third party that is not an authorized product may be used.

Japanese Patent Laid-Open No. 2011-65752 describes a technique for verifying authenticity of a battery cell of an electric vehicle by integrating a microcomputer with the battery cell.

However, there is a problem that integrating a microcomputer as in the technique described in Japanese Patent Laid-Open No. 2011-65752 requires cost.

SUMMARY OF THE INVENTION

The present invention has been made in view of the above problem, and provides a technique for suppressing use of a copied product of a mobile battery at low cost.

According to one aspect of the present invention, there is provided an information processing apparatus with a DC-DC converter, comprising:
  a calculation unit configured to calculate an impedance of a mobile battery attached to the information processing apparatus; and
  a control unit configured to control continuation or stop of a boost operation of the DC-DC converter on a basis of the impedance, wherein
  the control unit
    performs control to continue the boost operation of the DC-DC converter when the impedance is less than a threshold, and
    performs control to continue the boost operation by limiting some of functions of the information processing apparatus when the impedance is equal to or more than the threshold and less than a second threshold.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a flowchart illustrating a procedure of processing performed by an information processing apparatus according to a second embodiment.

DESCRIPTION OF THE EMBODIMENTS

Figure 1:
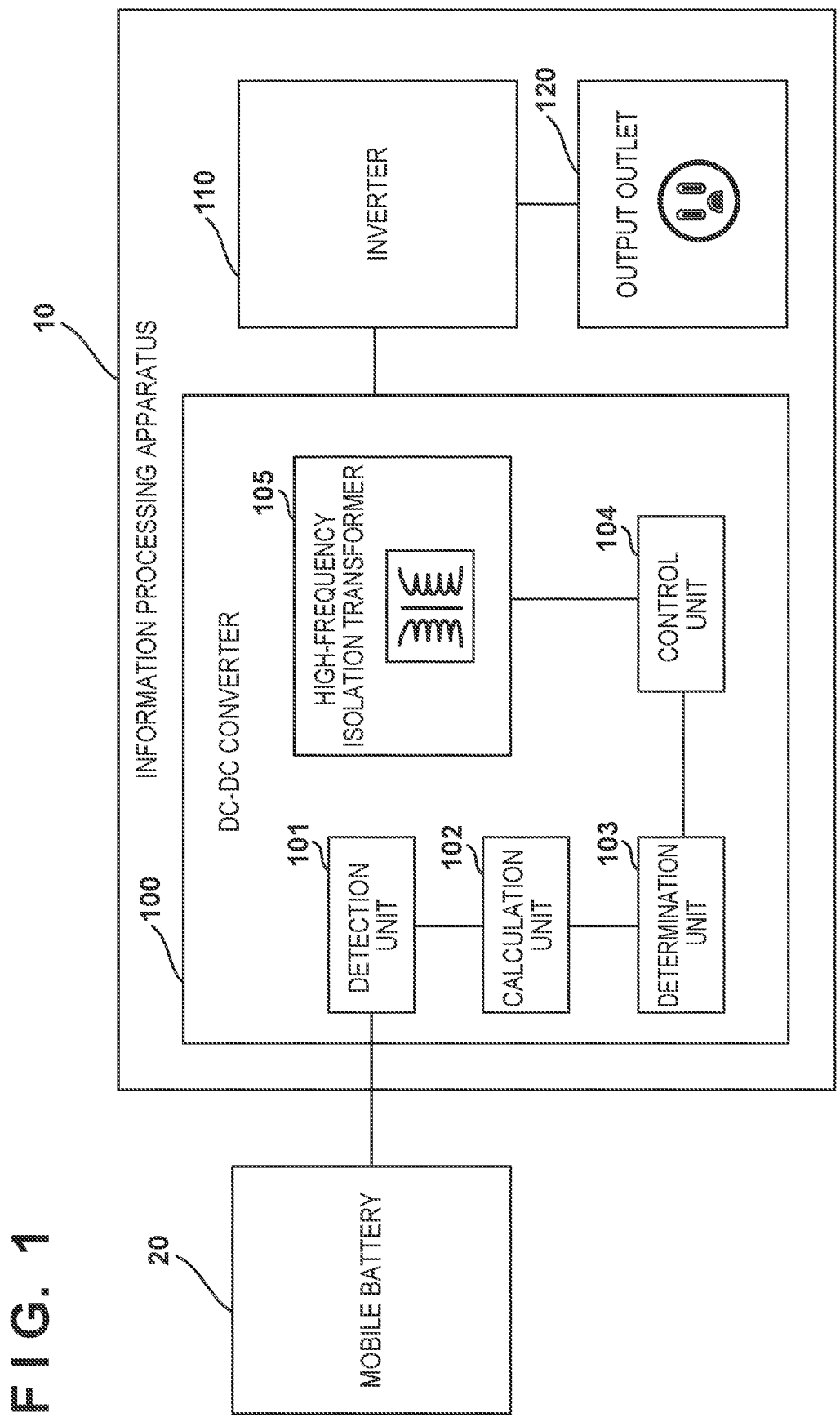
FIG. 1 is a diagram illustrating a configuration example of an information processing system according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<System Configuration>

FIG. 1 is a diagram illustrating a configuration example of an information processing system according to an embodiment. The information processing system according to the present embodiment includes an information processing apparatus 10 and a mobile battery 20. The information processing apparatus 10 is, for example, a generator, and can convert DC power supplied from the mobile battery 20 into AC power and output the AC power. By receiving supply of the AC power from the information processing apparatus 10, another apparatus can operate. The mobile battery 20 can be detached from the information processing apparatus 10 and can be attached to the information processing apparatus 10, that is, freely detachable.

The information processing apparatus 10 includes a DC-DC converter 100, an inverter 110, and an output outlet 120.

The DC-DC converter 100 includes a detection unit 101, a calculation unit 102, a determination unit 103, a control unit 104, and a high-frequency isolation transformer 105. Operations of the detection unit 101, the calculation unit 102, the determination unit 103, and the control unit 104 can be implemented, for example, by one or more CPUs (not illustrated) reading and executing a computer program stored in a recording medium (not illustrated) such as one or more memories.

The detection unit 101 detects a battery current and a battery voltage input from the mobile battery 20 attached to the information processing apparatus 10. The calculation unit 102 calculates an impedance (internal resistance value) of the mobile battery 20. Details of a calculation method will be described later. The determination unit 103 determines whether or not the impedance of the mobile battery 20 calculated by the calculation unit 102 is equal to or more than a threshold.

The control unit 104 controls a boost operation by the DC-DC converter 100 by controlling an operation of the high-frequency isolation transformer 105 on the basis of a determination result of the determination unit 103. More specifically, when the impedance of the mobile battery 20 is equal to or more than the threshold, the control unit 104 performs control to stop the boost operation, and when the impedance of the mobile battery 20 is less than the threshold, the control unit 104 performs control to continue the boost operation.

The DC power of the mobile battery 20 is, for example, 40 V to 60 V, and 48 V in the present embodiment. The voltage is boosted to, for example, 165 V by the DC-DC converter 100. The inverter 110 converts the DC power boosted by the DC-DC converter 100 into AC power (for example, AC 100 V).

The output outlet 120 can output the AC power (for example, AC 100 V) converted by the inverter 110 to the outside. Another apparatus receives power supply and can operate by being connected to the output outlet 120.

Note that, in the illustrated example, the configuration in which the information processing apparatus 10 includes the inverter 110 and the output outlet 120 has been described. However, the information processing apparatus 10 may have a configuration that does not include these components or a part or the whole of the high-frequency isolation transformer 105.

<Processing>

Figure 2:
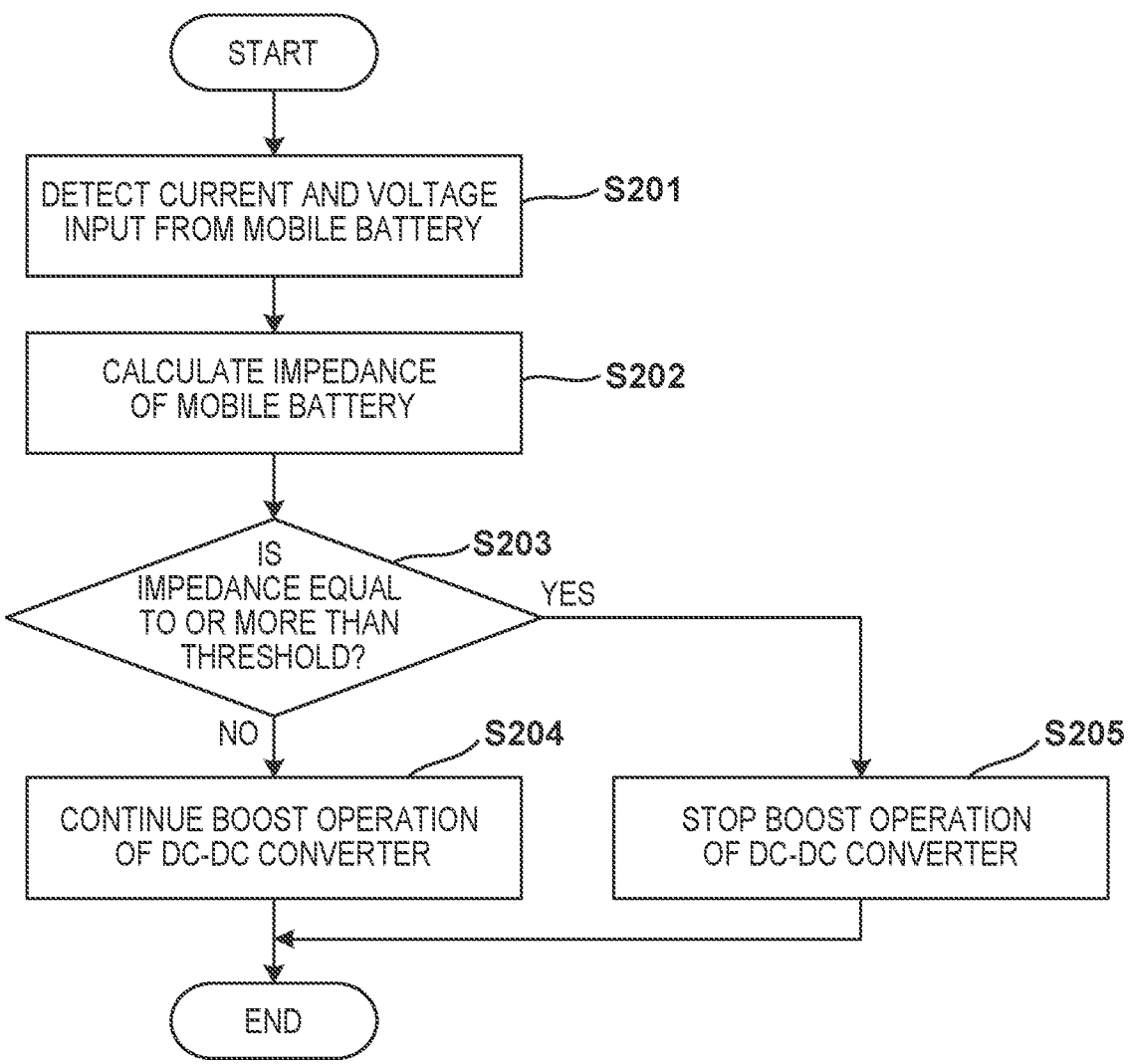
FIG. 2 is a flowchart illustrating a procedure of processing performed by an information processing apparatus according to a first embodiment.

Next, a procedure of processing performed by the information processing apparatus 10 according to the present embodiment will be described with reference to the flowchart of FIG. 2 and FIG. 3.

In S201, the detection unit 101 detects a current and a voltage input from the mobile battery 20 attached to the information processing apparatus 10.

In S202, the calculation unit 102 calculates an impedance of the mobile battery 20.

Figure 3:
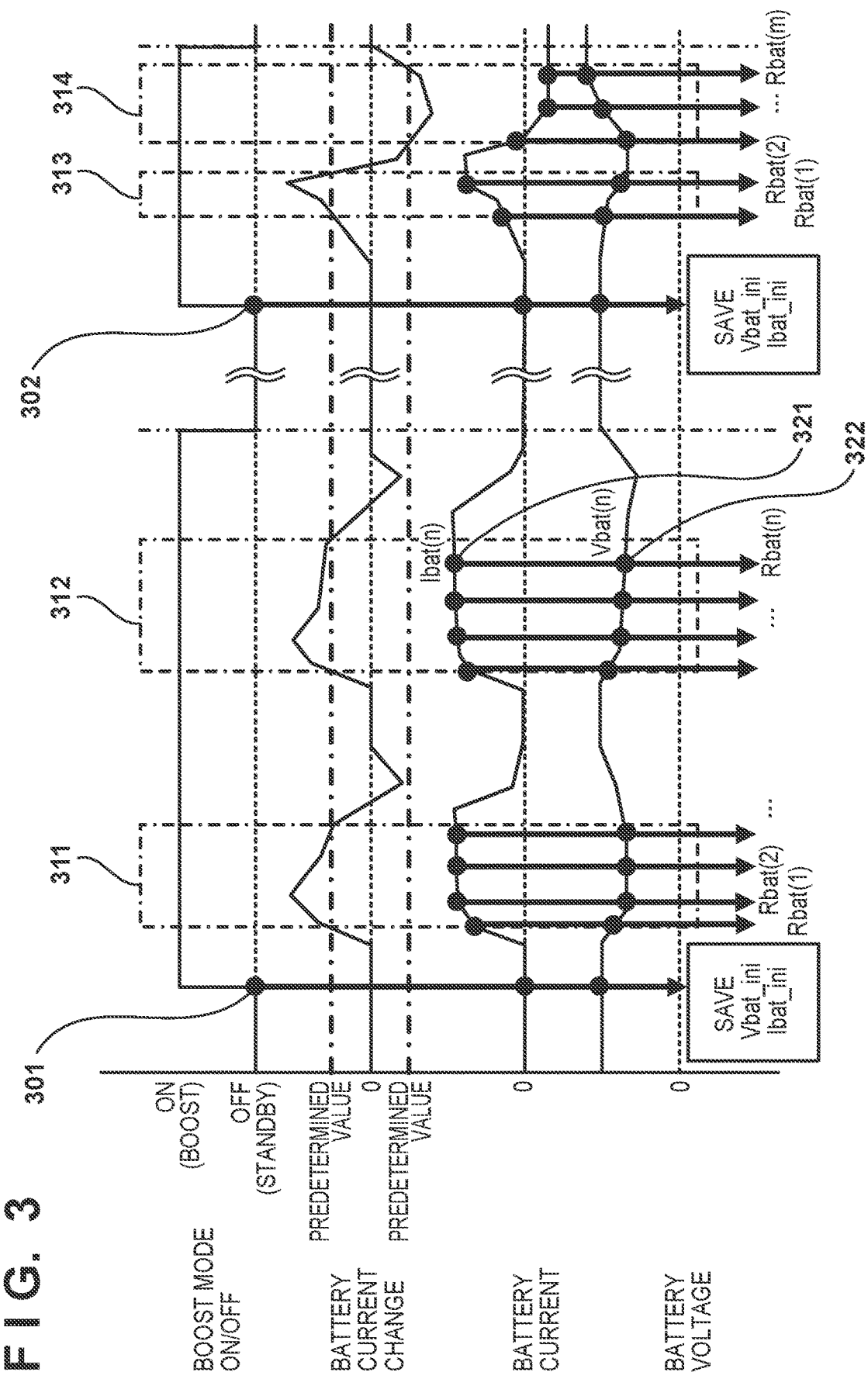
FIG. 3 is an explanatory diagram of a method for calculating an impedance of a mobile battery according to an embodiment.

Here, FIG. 3 is an explanatory diagram of a method for calculating an impedance of a mobile battery according to an embodiment. The horizontal axis represents time, and the vertical axis represents various values (or on/off of a mode). A standby state and a boost state can be switched from each other by switching on/off of a boost mode of the DC-DC converter 100. The standby state is switched to the boost state at timings indicated by points 301 and 302. Then, a battery voltage and a battery current at each of the points 301 and 302 are saved as Vbat_ini and Ibat_ini, respectively. The boost mode can be switched between on and off by, for example, a user's switch on/off operation. Detection of a current and a voltage input from the mobile battery 20 may be started in response to switching to the boost state.

The calculation unit 102 measures an amount of change in a battery current input from the mobile battery 20, and uses a battery current Ibat and a battery voltage Vbat in a period (for example, periods 311, 312, 313, and 314) in which the amount of change is equal to or more than a predetermined value or less than the predetermined value for calculation of an impedance. This is for the purpose of calculating an impedance when a consumption current that can calculate an impedance of the mobile battery is generated.

Here, when Rbat (n) is a calculated value of battery internal resistance at a time point n (that is, an impedance of the mobile battery 20), Vbat_ave is a battery voltage moving average value, Ibat_ave is a battery current moving average value, Ktr is a temperature coefficient for internal resistance calculation, and Kir is a current coefficient for internal resistance calculation, Rbat (n) can be calculated using the following formula (1).

$$R\text{bat}(n) = \{V\text{bat}(n) - V\text{bat\_ave}\} / \{I\text{bat\_ave} - I\text{bat}(n)\} * K\text{tr} * K\text{ir} \quad (1)$$

In the example of FIG. 3, Rbat (n) is calculated by formula (1) using a battery current Ibat(n) at a time point n indicated by a point 321 and a battery voltage Vbat(n) at the time point n indicated by a point 322. Here, Ktr is a coefficient that is a small value at a low temperature and is a large value at a high temperature. In addition, Kir is a coefficient that is a small value when an amount of change in a current value is large, and is a large value when the amount of change is small. Vbat_ave and Ibat_ave are a battery voltage moving average value and a battery current moving average value after Vbat_ini and Ibat_ini, respectively.

In S203, the determination unit 103 determines whether or not the impedance of the mobile battery 20 calculated by the calculation unit 102 is equal to or more than a threshold. Here, the threshold can be set to any value, and is, for example, a value on the order of milliohms, and a value on the order of 10 milliohms can be used as an example. If the impedance is equal to or more than the threshold (YES in S203), the process proceeds to S205. Meanwhile, if the impedance is less than the threshold (NO in S203), the process proceeds to S204.

In S204, the control unit 104 determines that the mobile battery 20 is a specific product (for example, an in-house product), and continues the boost operation of the DC-DC converter 100.

In S205, the control unit 104 determines that the mobile battery 20 is not a specific product (for example, an in-house product), and stops the boost operation of the DC-DC converter 100. This is an end of the series of processing in FIG. 2.

As described above, in the present embodiment, an impedance of the mobile battery is calculated, and continuation or stop of the boost operation of the DC-DC converter is controlled on the basis of the calculated impedance. For example, when the impedance is equal to or more than the threshold, it is determined that the mobile battery 20 is not a specific product (for example, an in-house product), and control to stop the boost operation is performed. As a result, it is possible to stop the boost operation of the DC-DC converter according to characteristics of an attached mobile battery.

If it cannot be determined whether the battery is an authorized product, an apparatus may operate with a mobile battery which is a copied product. However, in this case, there is no guarantee that the battery can take charge of input ripple power. Therefore, conventionally, it is necessary to ensure the entire amount with an energy storage element (a capacitor or the like) on a converter side, which leads to an increase in size and cost of an apparatus. However, according to the present embodiment, it is possible to suppress use of a copied product of a mobile battery at low cost, and furthermore, it is possible to reduce the size of an apparatus.

In addition, it is possible to make use of a mobile battery (copied product) having a high impedance impossible. Therefore, capacitor heat generation of a converter can be suppressed, and a life of the converter can also be extended.

Second Embodiment

In the first embodiment, an example in which control is switched on the basis of a magnitude relationship between the impedance of the mobile battery and one threshold has been described. Meanwhile, in the present embodiment, an example will be described in which a plurality of impedance thresholds is set and more detailed control is performed according to comparison with the thresholds.

Note that since configurations of an information processing system and an information processing apparatus according to the present embodiment are similar to those of the first embodiment, description thereof is omitted.

<Processing>

Hereinafter, a procedure of processing performed by the information processing apparatus according to the present embodiment will be described with reference to the flowchart of FIG. 4. Note that the same steps as those described with reference to FIG. 2 are denoted by the same reference numerals, redundant description is omitted, and description will be mainly given focusing on differences. In addition, a method for calculating an impedance of the mobile battery 20 is similar to the method described with reference to FIG. 3.

In S203, the determination unit 103 determines whether or not the impedance of the mobile battery 20 calculated by the calculation unit 102 is equal to or more than a threshold. If the impedance is equal to or more than the threshold (YES in S203), the process proceeds to S401. Meanwhile, if the impedance is less than the threshold (NO in S203), the process proceeds to S204.

In S401, the determination unit 103 determines whether or not the impedance of the mobile battery 20 calculated by the calculation unit 102 is equal to or more than a second threshold which is more than the threshold used for determination in S203. If the impedance is equal to or more than the second threshold, the process proceeds to S205. Meanwhile, if the impedance is equal to or more than the threshold used for determination in S203 but less than the second threshold, the process proceeds to S402.

In S402, the control unit 104 performs control so as to perform a limited operation of limiting some of functions of the information processing apparatus 10 although continuing a boost operation itself. When the impedance increases, a calorific value also increases according to the increase, and therefore the operation is limited so as to be performed according to the increase. The content of the limited operation may be performed by various methods, but for example, some of various functions of the information processing apparatus 10 may be stopped, or an output of the information processing apparatus 10 (for example, an output of the DC-DC converter 100) may be suppressed. Alternatively, a limitation may be imposed such that the information processing apparatus 10 has availability confirmed by a server (not illustrated), and a temporary use permission is issued depending on a condition of an outside temperature, for example, a use permission is issued under a low temperature condition. However, in this case, for example, a life may be shortened or a product may be deteriorated due to heat generation of the DC-DC converter 100. Therefore, when the server issues a use permission, billing or the like may be performed. This is an end of the series of processing in FIG. 4.

As described above, in the present embodiment, switch is performed between stop of the boost operation and execution of the limited operation of the information processing apparatus 10 depending on whether the impedance is equal to or more than the second threshold.

As a result, even when the impedance is equal to or more than the threshold, the boost operation can be continued in a case where the impedance is equal to or less than the second threshold. Therefore, it is possible to absorb an increase in an impedance of a mobile battery which is an authorized product due to aging deterioration or the like. Therefore, it is possible to suppress stop of the operation even though the mobile battery is an authorized product, and to implement more adaptive control.

[Modification]

Note that, in the above embodiments, the description has been given on the premise that the information processing apparatus 10 is a generator, but the above embodiments can also be applied to other apparatuses to which a mobile battery can be attached (for example, a wide range of apparatuses including a vehicle such as a four-wheeled vehicle or a two-wheeled vehicle) in addition to the generator.

In the above embodiments, when the impedance of the mobile battery 20 is equal to or more than the threshold (or equal to or more than the second threshold), control to stop the boost operation is performed, but in this case, notification may be performed. For example, by blinking/lighting of light, a notification sound, or a voice message, notification that the boost operation has stopped, that there is a possibility that a mobile battery that is not a specific product (for example, an in-house product) is attached, and/or that there is a possibility of aging deterioration may be performed. As a result, it is possible to encourage a user of the information processing apparatus 10 to use a mobile battery which is an authorized product. In addition, when there is a possibility of aging deterioration or the like even when the mobile battery is an authorized product, it is possible to encourage replacement with a new authorized product.

In addition, in the above embodiments, an example has been described in which control according to whether the impedance of the mobile battery is equal to or more than the threshold (or equal to or more than the second threshold) is performed, but control according to whether the impedance of the mobile battery is within a predetermined threshold range may be performed. For example, when the impedance is a value within a predetermined range, it may be determined that the mobile battery is an authorized product and the boost operation may be continued, and when the impedance is a value outside the predetermined range, it may be determined that the mobile battery is not an authorized product and the boost operation may be stopped. In addition, for the limited operation described in the second embodiment, similar processing may be performed by setting a first threshold range and a second threshold range. For example, the first threshold range may be equal to or more than a first predetermined value and less than a second predetermined value, and the second threshold range may be equal to or more than the second predetermined value and less than a third predetermined value, or equal to more than a fourth predetermined value and less than the first predetermined value, which is outside the first threshold range. In a case where the impedance is outside the first threshold range but is within the second threshold range, control may be performed such that the limited operation of limiting some of functions of the information processing apparatus 10 although continuing the boost operation itself is performed.

Other Embodiments

In addition, a program for achieving one or more functions that have been described in the embodiments is supplied to a system or an apparatus through a network or a storage medium, and one or more processors in a computer of the system or the apparatus can read and execute the program. The present invention can also be achieved by such an aspect.

The invention is not limited to the foregoing embodiments, and various variations/changes are possible within the spirit of the invention.

Summary of Embodiments

An information processing apparatus (for example, 10) according to a first aspect is an information processing apparatus (for example, 10) with a DC-DC converter (for example, 100), including:
a calculation unit (for example, 102) that calculates an impedance of a mobile battery (for example, 20) attached to the information processing apparatus; and
a control unit (for example, 104) that controls continuation or stop of a boost operation of the DC-DC converter on the basis of the impedance.

As a result, it is possible to stop the boost operation of the DC-DC converter according to characteristics of the attached mobile battery, and thus, it is possible to suppress use of a copied product of the mobile battery at low cost.

An information processing apparatus (for example, 10) according to a second aspect further includes a determination unit (for example, 103) that determines whether or not the impedance is equal to or more than a threshold, in which
the control unit performs control to continue the boost operation of the DC-DC converter when the impedance is less than the threshold.

As a result, a mobile battery estimated to be a specific product (for example, an authorized product) can be continuously used.

In an information processing apparatus (for example, 10) according to a third aspect, the control unit performs control to stop the boost operation of the DC-DC converter when the impedance is equal to or more than the threshold.

As a result, it is possible to suppress use of a mobile battery (for example, a copied product) estimated not to be a specific product (for example, an authorized product).

In an information processing apparatus (for example, 10) according to a fourth aspect, the determination unit further determines whether or not the impedance is equal to or more than a second threshold that is more than the threshold, and
the control unit performs control to continue the boost operation by limiting some of functions of the information processing apparatus when the impedance is equal to or more than the threshold and less than the second threshold.

As a result, it is possible to absorb an increase in impedance of a mobile battery of an authorized product due to aging deterioration or the like. Therefore, it is possible to suppress stop of the operation even though the mobile battery is an authorized product, and to implement more adaptive control.

In an information processing apparatus (for example, 10) according to a fifth aspect, the control unit performs control to stop the boost operation of the DC-DC converter when the impedance is equal to or more than the second threshold.

As a result, it is possible to suppress use of a mobile battery (for example, a copied product) estimated not to be a specific product (for example, an authorized product).

An information processing apparatus (for example, 10) according to a sixth aspect further includes a notification unit that performs notification when some of the functions of the information processing apparatus are limited by the control unit.

As a result, it is possible to easily recognize that there is a possibility that the mobile battery is not an authorized product, or that there is a possibility of aging deterioration even when the mobile battery is an authorized product.

An information processing apparatus (for example, 10) according to a seventh aspect further includes a notification unit that performs notification when the control unit stops the boost operation.

As a result, it is possible to easily recognize that the mobile battery is not an authorized product.

A method for controlling an information processing apparatus (for example, 10) according to an eighth aspect is a method for controlling an information processing apparatus with a DC-DC converter (for example, 100), the method including:
a calculation step (for example, S202) of calculating an impedance of a mobile battery (for example, 20) attached to the information processing apparatus; and
a control step (for example, S203 to S205, S401, and S402) of controlling continuation or stop of a boost operation of the DC-DC converter on the basis of the impedance.

As a result, it is possible to stop the boost operation of the DC-DC converter according to characteristics of the attached mobile battery, and thus, it is possible to suppress use of a copied product of the mobile battery at low cost.

A program according to a ninth aspect is a program for causing a computer to function as the information processing apparatus according to any one of the first to seventh aspects.

As a result, the functions of the information processing apparatus can be implemented by a computer.

According to the present invention, it is possible to stop the boost operation of the DC-DC converter according to characteristics of the attached mobile battery, and thus, it is possible to suppress use of a copied product of the mobile battery that does not match characteristics at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus with a DC-DC converter, comprising:
at least one processor circuit with a memory comprising machine-readable instructions that, when executed by the at least one processor circuit, cause the at least one processor circuit to at least:
calculate an impedance of a mobile battery attached to the information processing apparatus; and
control continuation or stop of a boost operation of the DC-DC converter on a basis of the calculated impedance, wherein
the controlling the continuation or stop of the boost operation further comprises:
performing control to continue the boost operation of the DC-DC converter when the calculated impedance is less than a threshold,
performing control to continue the boost operation without limiting some of functions of the information processing apparatus in a case where the information processing apparatus determines that a permission is granted, and performs to continue the boost operation by limiting some of functions of the information processing apparatus in a case where the information processing apparatus does not determine that the permission is granted, when the calculated impedance is equal to or more than the threshold and less than a second threshold, and performing control to stop the boost operation of the DC-DC converter when the calculated impedance is equal to or more than the second threshold.

2. The information processing apparatus according to claim 1, wherein the permission is a temporary use permission issued depending on a condition of an outside temperature.

3. The information processing apparatus according to claim 1, wherein the machine-readable instructions, executed by the at least one processor circuit, further cause the at least one processor circuit to at least perform notification when some of the functions of the information processing apparatus are limited by the at least one processor circuit.

4. The information processing apparatus according to claim 1, wherein the machine-readable instructions, executed by the at least one processor circuit, further cause the at least one processor circuit to at least perform notification when the boost operation is stopped by the at least one processor circuit.

5. A non-transitory computer-readable storage medium storing a program for causing a computer to execute a method for controlling an information processing apparatus with a DC-DC converter, the method comprising:

calculating an impedance of a mobile battery attached to the information processing apparatus; and controlling continuation or stop of a boost operation of the DC-DC converter on a basis of the calculated impedance, wherein in the controlling, control to continue the boost operation of the DC-DC converter is performed when the calculated impedance is less than a threshold, and control to continue the boost operation without limiting some of functions of the information processing apparatus is performed in a case where the information processing apparatus determines that a permission is granted, and performs to continue the boost operation by limiting some of functions of the information processing apparatus in a case where the information processing apparatus does not determine that the permission is granted, when the calculated impedance is equal to or more than the threshold and less than a second threshold, and control to stop the boost operation of the DC-DC converter is performed when the calculated impedance is equal to or more than the second threshold.

\* \* \* \* \*